United States Patent
Adachi

(10) Patent No.: US 6,959,357 B2
(45) Date of Patent: Oct. 25, 2005

(54) INTEGRATED CIRCUIT AND METHOD OF CONTROLLING SAME

(75) Inventor: Kaoru Adachi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 434 days.

(21) Appl. No.: 09/852,683

(22) Filed: May 11, 2001

(65) Prior Publication Data

US 2001/0042153 A1    Nov. 15, 2001

(30) Foreign Application Priority Data

May 11, 2000    (JP) ............................. 2000-137905

(51) Int. Cl.⁷ .......................... G06F 13/00; G06F 1/06
(52) U.S. Cl. ................. 710/316; 710/305; 713/501
(58) Field of Search ................... 710/312, 316, 710/311, 304, 305, 307, 107, 29, 58, 306, 710/309; 713/400, 500, 600, 501; 370/444; 331/49; 327/291

(56) References Cited

U.S. PATENT DOCUMENTS

| | | | | |
|---|---|---|---|---|
| 3,594,656 A | * | 7/1971 | Tsukamoto | 331/49 |
| 4,476,527 A | * | 10/1984 | Clayton, IV | 710/29 |
| 4,922,409 A | * | 5/1990 | Schoellkopf et al. | 710/316 |
| 5,263,172 A | * | 11/1993 | Olnowich | 710/307 |
| 5,481,679 A | * | 1/1996 | Higaki et al. | 710/316 |
| 5,491,814 A | * | 2/1996 | Yee et al. | 713/501 |
| 5,577,215 A | * | 11/1996 | Lee et al. | 710/316 |
| 5,862,359 A | * | 1/1999 | Nozuyama | 710/316 |
| 6,061,754 A | * | 5/2000 | Cepulis et al. | 710/312 |
| 6,134,621 A | * | 10/2000 | Kelley et al. | 710/311 |
| 6,141,717 A | * | 10/2000 | Yamanoi et al. | 710/306 |
| 6,161,189 A | * | 12/2000 | Arimilli et al. | 713/600 |
| 6,237,057 B1 | * | 5/2001 | Neal et al. | 710/309 |
| 6,255,882 B1 | * | 7/2001 | Hirai | 327/291 |
| 6,295,568 B1 | * | 9/2001 | Kelley et al. | 710/305 |
| 6,425,041 B1 | * | 7/2002 | Klein | 710/306 |
| 6,425,088 B1 | * | 7/2002 | Yasukawa et al. | 713/400 |
| 6,487,620 B1 | * | 11/2002 | Grosshog et al. | 710/107 |
| 6,516,362 B1 | * | 2/2003 | Magro et al. | 710/58 |
| 6,519,669 B1 | * | 2/2003 | Yanagisawa | 710/304 |
| 6,535,946 B1 | * | 3/2003 | Bryant et al. | 710/305 |
| 6,560,240 B1 | * | 5/2003 | Borland et al. | 370/444 |
| 6,662,260 B1 | * | 12/2003 | Wertheim et al. | 710/316 |

FOREIGN PATENT DOCUMENTS

| | | | | | |
|---|---|---|---|---|---|
| JP | | 63037453 A | * | 2/1988 | G06F 13/28 |
| JP | | 04308957 A | * | 10/1992 | G06F 13/42 |
| JP | | 05094226 A | * | 4/1993 | G06F 1/04 |
| JP | | 2000020459 A | * | 1/2000 | G06F 13/36 |

* cited by examiner

Primary Examiner—Glenn A. Auve
Assistant Examiner—Christopher E. Lee
(74) Attorney, Agent, or Firm—Birch Stewart Kolasch & Birch, LLP

(57) ABSTRACT

Bus-connected circuits are made to operate stably and at high speed. A cache memory for high-speed access and a DRAM for low-speed access are connected to a CPU by an address bus, control bus and data transfer bus. A switch is provided in the bus at a point between the cache memory and DRAM and the switch is opened at the time of high-speed access. Since bus length is essentially shortened at such time, the cache memory can be accessed stably at high speed. When the DRAM is accessed, the switch is closed.

5 Claims, 3 Drawing Sheets

INTEGRATED CIRCUIT AND METHOD OF CONTROLLING SAME

BACKGROUND OF THE INVENTION

1. Field of the Invention

This invention relates to an integrated circuit in which a high-speed access device and a low-speed access device are connected by a common bus, and to a method of controlling this integrated circuit.

2. Description of the Related Art

When a digital circuit is constructed, a plurality of devices are connected to a single common bus. Transfer of data to the plurality of devices is performed through the single common bus.

It is necessary to raise the frequency of the operating clock pulses in order to raise the data transfer speed. Owing to the effects of bus capacitative load, however, there is an upper limit on the frequency of the operating clock pulses. Though changing the material used in the bus in order to improve the bus characteristic is conceivable, this would raise cost. Further, if the frequency of the operating clock pulses is raised to achieve high speed, operation will not be stable in a circuit having a long bus.

DISCLOSURE OF THE INVENTION

Accordingly, an object of the present invention is to operate an integrated circuit stably and at high speed even if the circuit has a long bus.

According to the present invention, the foregoing object is attained by providing an integrated circuit in which a device for high-speed access, a device for low-speed access and a control circuit for controlling transfer of data to these devices are connected by a common bus in such a manner that transfer of data to the device for high-speed access takes priority, the integrated circuit comprising: a switch circuit for performing control to turn on and off the bus connection between the device for high-speed access and the device for low-speed access, and a control circuit for controlling the switch circuit so as to turn off the bus connection when data is transferred to the device for high-speed access and turn on the bus connection when data is transferred to the device for low-speed access.

The present invention provides also a control method suited to the above-described integrated circuit. Specifically, there is provided a method of controlling an integrated circuit in which a device for high-speed access, a device for low-speed access and a control circuit for controlling transfer of data to these devices are connected by a common bus in such a manner that transfer of data to the device for high-speed access will take priority, the method comprising the steps of: providing a switch circuit for performing control to turn on and off the bus connection between the device for high-speed access and the device for low-speed access, and controlling the switch circuit so as to turn off the bus connection when data is transferred to the device for high-speed access and turn on the bus connection when data is transferred to the device for low-speed access.

In accordance with the present invention, a device for high-speed access, a device for low-speed access and a control circuit for controlling transfer of data to these devices are connected by a common bus in such a manner that transfer of data to the device for high-speed access will take priority. A switch circuit for performing control to turn on and off the bus connection is provided between the device for high-speed access and the device for low-speed access. The switch circuit is controlled so as to turn off the bus connection when data is transferred to the device for high-speed access and turn on the bus connection when data is transferred to the device for low-speed access.

Since the switch circuit turns off the common bus connection when data is transferred to the device for high-speed access, the device for low-speed access is disconnected from the common bus. Since the length of the common bus therefore is essentially shortened, stable operation is possible even when the circuit is operated at high speed.

The invention is applicable also to an integrated circuit in which a plurality of devices inclusive of the device for high-speed access and the device for low-speed access are connected by the common bus so as to be given priority for data transfer in order of decreasing access speed. In this case, switch circuits would turn on and off the bus connection between mutually adjacent devices among the plurality of devices. Further, the switch control circuit would turn on the switch circuits in order so as to make possible access to a device circuit having a higher access speed.

It is preferred that the integrated circuit further include an output circuit. When the device for high-speed access, the device for low-speed access and the switch control circuit each operate in sync with clock pulses, the output circuit outputs, in sync with the clock pulses, a signal that enables transfer of data upon elapse of a fixed period of time after the switch control circuit is turned on.

It will be understood that by outputting the signal that enables data transfer, the transfer of data of the device for high-speed access ceases and the common bus is released. As a result, transfer of data to the device for low-speed access can be carried out.

The output timing of the data-transfer enable signal output from the output circuit would differ in dependence upon the access speeds of the above-mentioned devices in such a manner that the lower the access speed, the later the output timing.

Further, the period of the clock pulses may change in dependence upon the access speed of the device to be accessed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the drawings.

Figure 1:
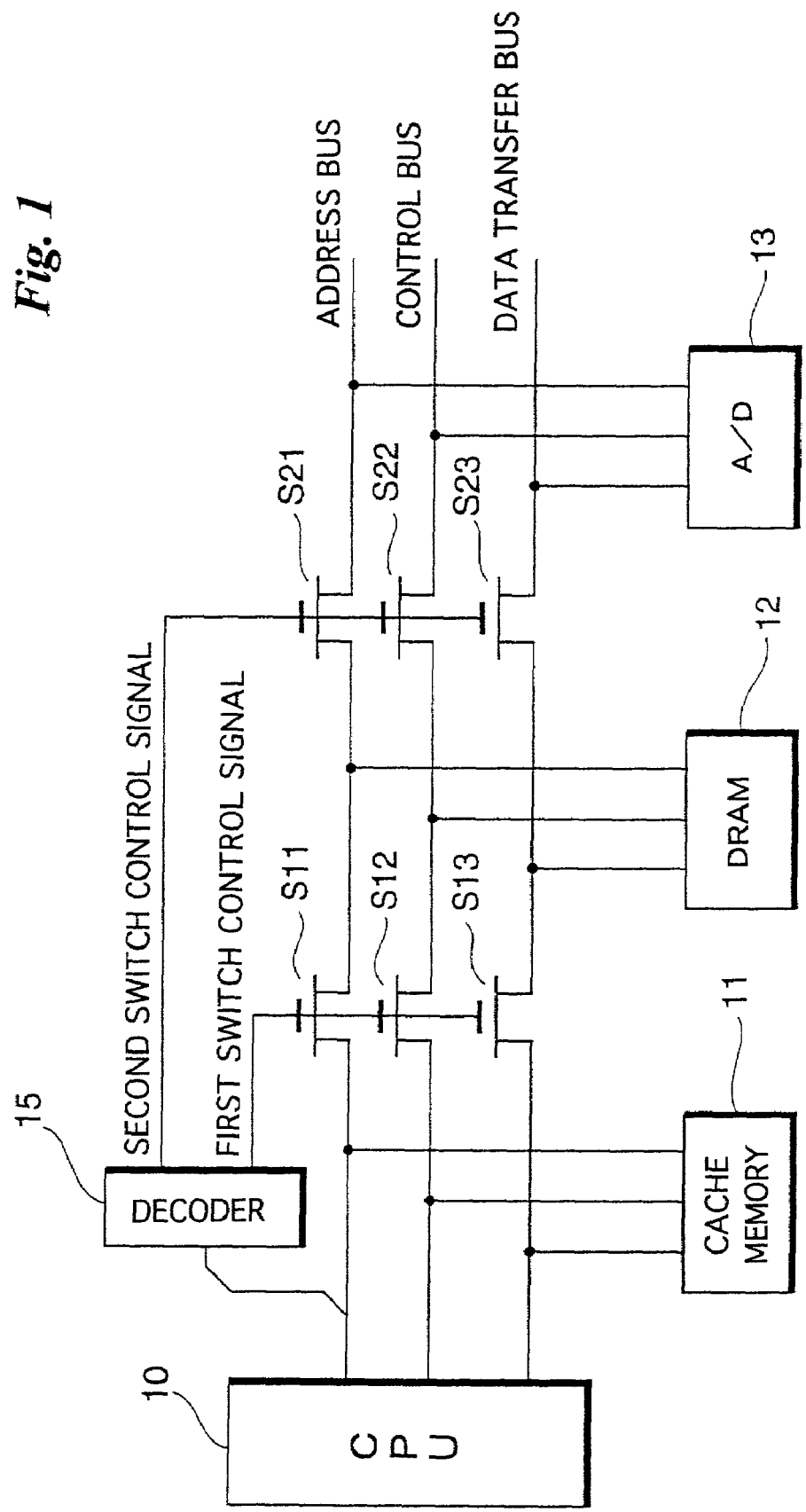
FIG. 1 is a block diagram showing the electrical construction of an integrated circuit according to a preferred embodiment of the present invention.

FIG. 1 is a block diagram showing the electrical construction of an integrated circuit according to a preferred embodiment of the present invention.

A common address bus for transferring address data, a common control bus for transferring control data, and a common data transfer bus for transferring data representing information such as images are connected to a CPU 10.

A cache memory 11, a DRAM (Dynamic Random-Access Memory) 12 and an A/D (Analog/Digital) conversion circuit 13 are connected to the address bus, control bus and data transfer bus. Switches S11, S12 and S13 each comprising a MOS (Metal Oxide Semiconductor) transistor are connected to the address bus, control bus and data transfer bus, respectively, at points between the DRAM 12 and CPU 10, and switches S21, S22 and S23 each comprising a MOS transistor are connected to the address bus, control bus and data transfer bus, respectively, at points between the DRAM 12 and A/D conversion circuit 13. Thus the switches S11, S12 and S13 and the switches S21, S22 and S23 are connected to the address bus, control bus and data transfer bus between the CPU 10 and the A/D conversion circuit 13. No switches are connected to the address bus, control bus and data transfer bus between the CPU 10 and the cache memory 11.

Among the cache memory 11, DRAM 12 and A/D conversion circuit 13, the cache memory 11 operates at the highest speed, the DRAM 12 operates at the next highest speed and the A/D conversion circuit 13 operates and the lowest speed. Accordingly, it can be said that the cache memory 11, DRAM 12 and A/D conversion circuit 13 have been connected to the address bus, control bus and data transfer bus in such a manner that priority of data transfer by the CPU 10 is given in order of decreasing operating speed.

The integrated circuit further includes a decoder 15 controlled by the CPU 10. The decoder 15 outputs a first switch control signal and a second switch control signal. The first switch control signal is applied to the gate terminals of the switches S11, S12 and S13, and the second switch control signal is applied to the gate terminals of the switches S21, S22 and S23.

The switches S11, S12 and S13 are turned on, thereby connecting the CPU 10 and DRAM 12 via the buses, in response to the first switch control signal attaining the H level. The switches S11, S12 and S13 are turned off, thereby disconnecting the DRAM 12 from the CPU 10 (i.e., severing the buses so that the A/D conversion circuit 13 also is disconnected from the CPU 10), in response to the first switch control signal attaining the L level.

The switches S21, S22 and S23 are turned on in response to the second switch control signal attaining the H level. If the switches S11, S12 and S13 also are on at this time, the CPU 10 and the A/D conversion circuit 13 are connected via the buses. The switches S21, S22 and S23 are turned off in response to the second switch control signal attaining the L level, whereby the A/D conversion circuit 13 is detached from the CPU 10.

Figure 2:
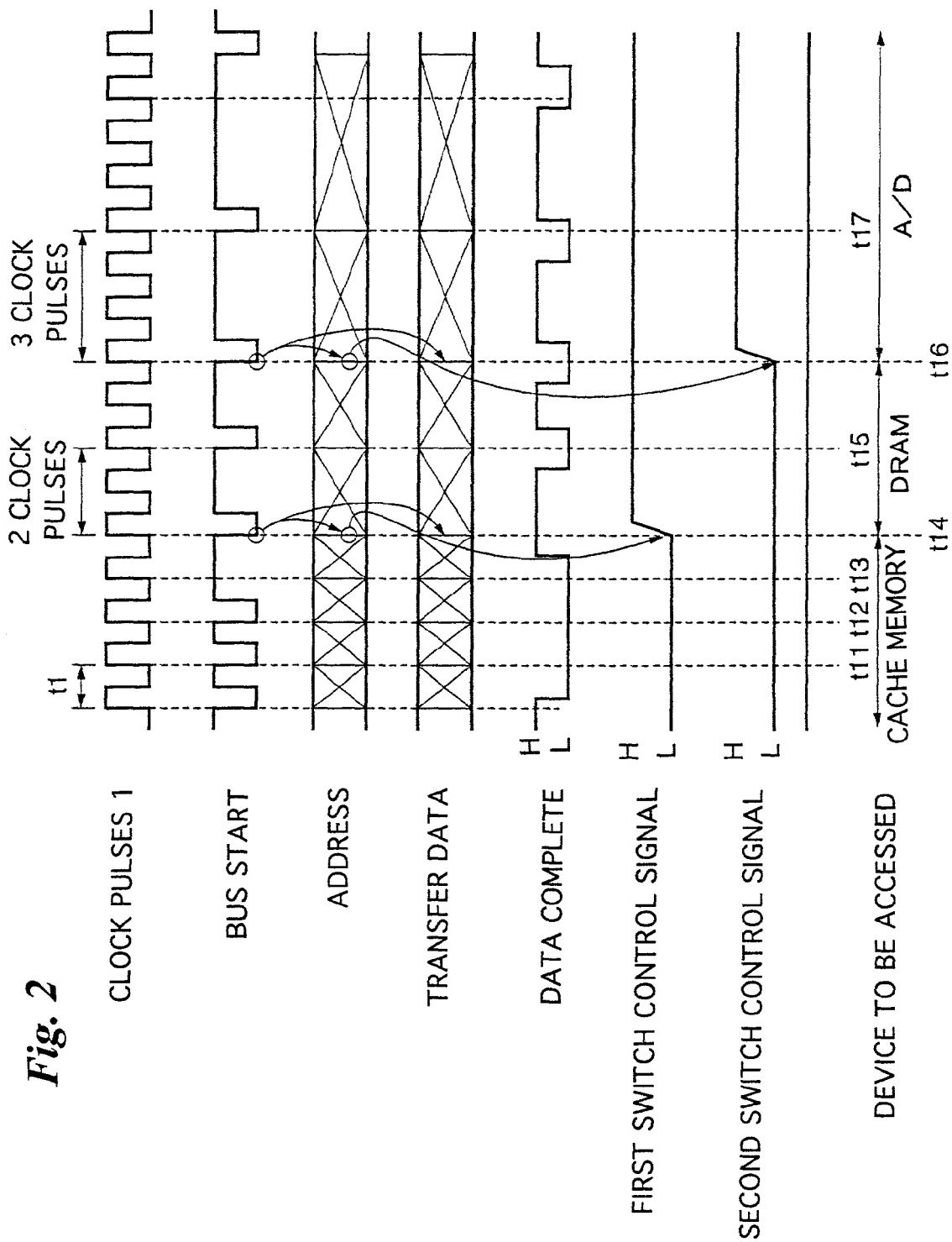
FIGS. 2 and 3 are operating time charts of the image data.

FIG. 2 is an example of a time chart illustrating the operation of the circuit shown in FIG. 1.

Clock pulses in FIG. 2 are output from a clock pulse generating circuit (not shown). The clock pulses are applied to all of the aforementioned circuits, namely the CPU 10, cache memory 11, DRAM 12, A/D conversion circuit 13 and decoder 15. The clock pulses have a period t1 which is fixed regardless of time.

A bus start signal and a data complete signal are control signals that flow through the control bus. The bus start signal indicates start of use of the bus. By falling to the L level, this signal indicates that use of the bus has started. The data complete signal is for indicating that data transfer is possible and that data transfer has ended. Transfer of data is possible when the data complete signal is at the L level. When the data complete signal rises to the H level, this indicates the end of data transfer.

Until time t14, the first switch control signal is at the L level and therefore all of the switches S11, S12 and S13 are off. The DRAM 12 and A/D conversion circuit 13 are disconnected from the CPU 10 and the CPU 10 is capable of accessing only the cache memory 11.

The bus start signal falls to the L level at time t11, at which time the data complete signal is at the L level and data transfer is possible. The CPU 10 outputs transfer data and address data, and the transfer data is written to the cache memory 11 at an address specified by the address data. Similarly, at times t12 and t13, data transfer becomes possible and data is written to the cache memory 11.

Since the first switch control signal is at the L level and the switches S11, S12 and S13 are off until time t14, bus length is essentially shortened. High-speed transfer, therefore, is stabilized. Since bus capacitative load and resistive load are small, data can be transferred at high speed. Further the consumption electric power can be reduced.

When time t14 arrives, the bus start signal falls to the L level and the first switch control signal output from the decoder 15 rises to the H level. The switches S11, S12 and S13 turn on, thereby connecting the CPU 10 and the DRAM 12 via the buses. This makes it possible for the CPU 10 to access the DRAM 12.

In order to assure time for the switches S11, S12 and S13 to turn on, control is exercised in such a manner that the data complete signal will be at the L level at time t15, which occurs two clock pulses after time t14.

Thus, data transfer to the DRAM 12 by the CPU 10 becomes possible and data is written to the DRAM 12 at the address specified by the address data.

When time t16 arrives, the bus start signal falls to the L level and the second switch control signal output from the decoder 15 rises to the H level. The switches S21, S22 and S23 turn on, thereby connecting the CPU 10, the DRAM 12 and the A/D conversion circuit 13 via the buses. This makes it possible for the CPU 10 to access the A/D conversion circuit 13.

In order to assure time for the switches S21, S22 and S23 to turn on in this case also, control is exercised in such a manner that the data complete signal will be at the L level at time t17, which occurs three clock pulses after time t16.

Thus, data transfer to the A/D conversion circuit 13 by the CPU 10 becomes possible and analog/digital conversion processing is executed.

Figure 3:
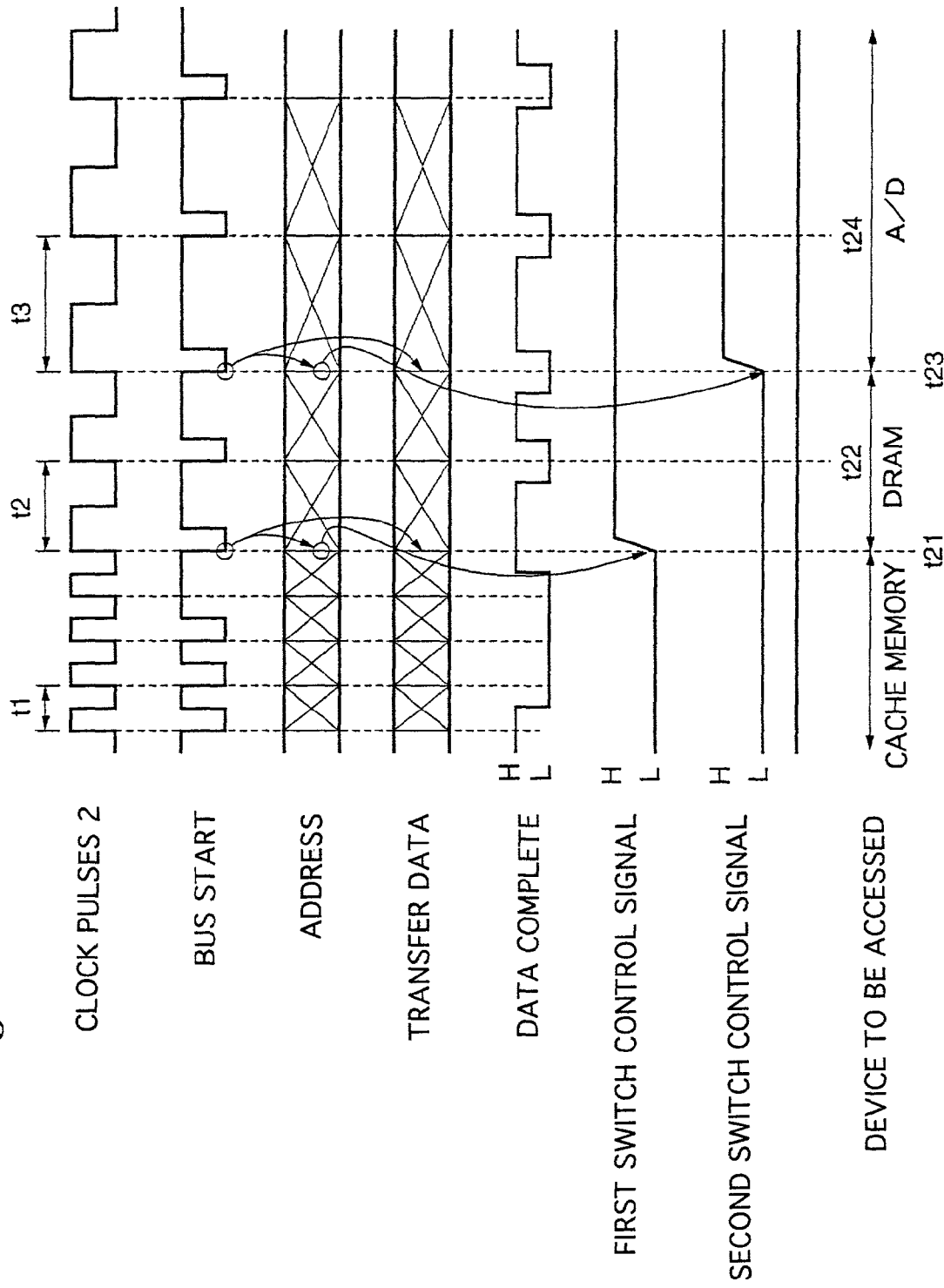

FIG. 3, which illustrates another embodiment, is a time chart illustrating operation of the circuit shown in FIG. 1.

The cache memory 11 is accessible until time t21. Both the cache memory 11 and DRAM 12 become accessible when time t22 arrives, and the cache memory 11, DRAM 12 and A/D conversion circuit 13 become accessible when time t23 arrives. This operation is similar to that shown in FIG. 2.

According to the operation shown in FIG. 3, the period of the clock pulses up to time t21, the period from time t21 to time t23, and the period from time t23 to time t24 differ from one another. Since access is performed at high speed until time t21, high-speed clock pulses of a correspondingly short period t1 are generated so that the circuit operates in conformity with these clock pulses. Since access is performed at medium speed from time t21 to time t23, clock pulses having a period t2 that is a little longer than t1 are generated. Since access is performed at low speed from time t23 to time t24, clock pulses having a period t3 of maximum length are generated.

These clock pulses can be generated using so-called clock gear, in which frequency can be varied using a frequency divider circuit and a PLL (Phase-Locked Loop).

In the case illustrated in FIG. 3, control is carried out in such a manner that the data complete signal falls to the L level after a delay of one clock pulse from time t21 and from time t23. As a result, data can be transferred to the DRAM 12 and A/D conversion circuit 13 after switches S11, S12 and S13 and switches S21, S22 and S23 have been turned on with certainty.

As many apparently widely different embodiments of the present invention can be made without departing from the spirit and scope thereof, it is to be understood that the invention is not limited to the specific embodiments thereof except as defined in the appended claims.

What is claimed is:

1. A bus architecture, comprising:
    first, second, and third bus portions;
    a first switch configured to enable/disable a connection between the first and second bus portions; and
    a second switch configured to enable/disable a connection between the second and third bus portions,
    wherein each of the first, second, and third bus portion operate based on a bus start signal and a data complete signal such that data transfer on the bus starts when the bus start signal is enabled and the data complete signal is disabled,
    wherein a delay between enabling of the bus start signal and disabling of the data complete signal varies based on enabled/disabled states of the first and second switches.

2. The bus architecture of claim 1, wherein the variance in the delay between the enabling of the bus start signal and the disabling of the data complete signal is based on a common bus signal.

3. The bus architecture of claim 2, wherein the variance in the delay between the enabling of the bus start signal and the disabling of the data complete signal is accomplished by varying a number of clock signals to wait.

4. The bus architecture of claim 2, wherein the variance in the delay between the enabling of the bus start signal and the disabling of the data complete signal is accomplished by varying a period of the clock signal.

5. The bus architecture of claim 1,
    wherein the delay is a first delay when both first and second switches are disabled, the delay is a second delay when first switch is enabled and second switch is disabled, and the delay is a third delay when both switches are enabled, and
    wherein the first delay is shorter than the second delay and the second delay is shorter than the third delay.

* * * * *